United States Patent
Coers et al.

(10) Patent No.: US 7,954,583 B2
(45) Date of Patent: Jun. 7, 2011

(54) AGRICULTURAL HARVESTER REAR AXLE ARRANGEMENT FOR NARROW TRANSPORT

(75) Inventors: Bruce Alan Coers, Hillsdale, IL (US); Daniel James Burke, Cordova, IL (US); Ryan Patrick Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 18 days.

(21) Appl. No.: 12/463,628

(22) Filed: May 11, 2009

(65) Prior Publication Data
US 2010/0283218 A1    Nov. 11, 2010

(51) Int. Cl.
*B62D 61/12* (2006.01)
(52) U.S. Cl. ........ 180/209; 180/906; 180/415; 172/297; 172/349
(58) Field of Classification Search .................. 180/209, 180/906, 415; 172/297, 349
See application file for complete search history.

(56) References Cited

U.S. PATENT DOCUMENTS

| | | | | |
|---|---|---|---|---|
| 3,572,458 A | * | 3/1971 | Tax ................ | 180/411 |
| 3,826,322 A | * | 7/1974 | Williams ........... | 180/202 |
| 3,972,379 A | * | 8/1976 | Norris ............. | 180/234 |
| 4,705,133 A | * | 11/1987 | Christenson et al. .... | 180/209 |
| 5,039,129 A | * | 8/1991 | Balmer ............. | 180/308 |
| 5,282,644 A | * | 2/1994 | Larson ............. | 280/638 |
| 5,343,972 A | * | 9/1994 | Balmer ............. | 180/209 |
| 5,454,583 A | * | 10/1995 | Torborg ............ | 280/638 |
| 5,489,113 A | * | 2/1996 | Torborg ............ | 280/638 |
| 5,489,114 A | * | 2/1996 | Ward et al. ......... | 280/638 |
| 6,039,194 A | * | 3/2000 | Beeche et al. ....... | 212/301 |
| 6,199,769 B1 | * | 3/2001 | Weddle ............. | 239/172 |
| 6,217,044 B1 | * | 4/2001 | Beeche et al. ....... | 280/43 |
| 6,386,554 B1 | * | 5/2002 | Weddle ............. | 280/6.154 |
| 6,827,176 B2 | * | 12/2004 | Bean et al. ......... | 180/411 |
| 7,163,227 B1 | * | 1/2007 | Burns .............. | 280/638 |
| 2005/0034911 A1 | * | 2/2005 | Darby .............. | 180/209 |
| 2007/0045012 A1 | * | 3/2007 | Brehob et al. ....... | 180/8.2 |
| 2008/0314656 A1 | * | 12/2008 | Brehob et al. ....... | 180/7.1 |

* cited by examiner

*Primary Examiner* — Paul N Dickson
*Assistant Examiner* — Marlon A Arce

(57) ABSTRACT

An agricultural harvester rear axle arrangement for an agricultural harvester (10) having a body (12), the arrangement comprising left and right rear wheels (18, 20); means for supporting the wheels for rotation about a generally vertical steering axis (38, 40, 78, 94) and for supporting the wheels for extension and retraction from the body of the combine (26, 28, 30, 90); actuator means for steering the wheels (38, 40, 70, 72, 94) and for extending and retracting the wheels (34, 36, 70, 72); an electronic controller (50) coupled to the actuator means to steer, extend and retract the wheels.

14 Claims, 3 Drawing Sheets

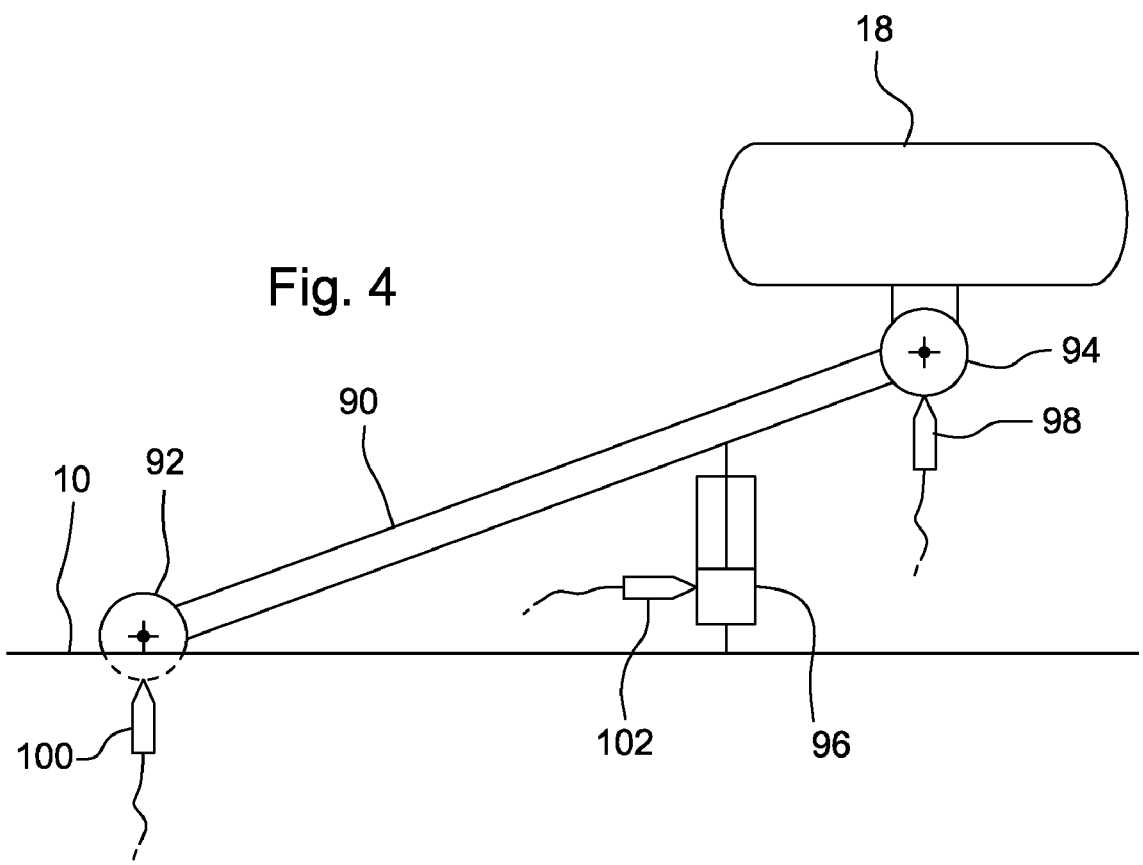

US 7,954,583 B2

AGRICULTURAL HARVESTER REAR AXLE ARRANGEMENT FOR NARROW TRANSPORT

FIELD OF THE INVENTION

The invention relates to agricultural equipment. More particularly, it relates to agricultural harvesters. Even more particularly, it relates to systems and methods for supporting and steering agricultural harvesters.

BACKGROUND OF THE INVENTION

Government agencies in Europe have established various requirements for vehicles that travel over the road. Some of these requirements cover agricultural harvesters. One such regulation establishes a maximum width for an agricultural harvester that is operated on public roads.

Most agricultural harvesters are operated on public roads as they go to and from the fields that they harvest. Many of these harvesters are very wide particularly those that are configured to thresh, separate, and clean grain. In order to accommodate the various threshing, separating, and cleaning elements their wheels must be spaced relatively widely apart.

At least two of their wheels must be turned left or right in order to steer the vehicle through the field and over the road. Whenever the wheels turn left and right about their pivot point, the rotation causes a portion of the wheels to move inward toward the side of the vehicle and a portion of the wheel to move outward away from the side of the vehicle.

The portion of the wheel that moves inward toward the side of the vehicle can only do so if there is a space provided between the wheel and the side of the vehicle. The less space there is between the wheel on the side of the vehicle, the smaller the angle through which the wheel can turn before it gets the side of the vehicle.

Wheel interference with a side of the vehicle is not a problem for vehicles such as automobiles. Automobile engines and engine compartments are relatively narrow, and therefore a significant empty space can be provided on the inside of the front wheels of a car to permit the front wheels to turn without rubbing against the engine compartment.

For agricultural harvesters, however, providing this additional space between the body of the harvester and the wheels reduces the space available for productive equipment inside the harvester for threshing, separating, and cleaning the grain.

Attempts have been made to provide a wider harvester body while still providing a good turning angle for the wheels by, for example, supporting the wheels on an angled pivot pin or "kingpin". As the wheels in these arrangements are turned, the wheels also turn slightly underneath the combine, and avoid rubbing up against the side walls of the combine.

Another system for providing room for a wider harvester body has been to reduce the diameter or width of the tires mounted on the wheels. If the wheels are smaller in diameter, they can be turned farther before they interfere with the side of the harvester body. With a smaller wheel, the harvester body can be made wider.

Neither of these two arrangements have been wholly successful. An angled kingpin will provide a little additional space but that is all. Wheels and tires can be made smaller, but they also require a reduction in the weight (and hence the production capacity) of the combine, which defeats the purpose of making the combine wider to begin with.

What is needed, therefore, is a different arrangement of the steering axle (typically the rear axle) of an agricultural combine that will provide for greater agricultural harvester width and productivity.

It is an object of this invention to provide such a combine rear axle arrangement.

SUMMARY OF THE INVENTION

In one aspect of the invention, an agricultural harvester rear axle arrangement is provided for an agricultural harvester in which the steerable wheels are simultaneously steered and extended or retracted under computer control. In this manner, the wheels can be retracted toward the left and right rear sides of the combine as close as possible for road transport, yet can be moved away from the sides of the combine when the combine is steered.

The agricultural harvester has left and right steerable rear wheels that are supported on the combine by any of a variety of members including such structures as a leading link, a trailing link, or a telescopic axle. Depending upon the particular structural members that support the wheels for extension and rotation about a steering axis, the actuators to provide this steering and rotation can include a linear actuator or a rotary actuator, such as a linear hydraulic cylinder, or a rotary hydraulic or electric motor.

Any electronic controller is provided to control the actuators to substantially simultaneously steer and extend or steer and retract the wheels in response to an operator selection of a desired steering angle indicated by an operator input device such as a vehicle steering wheel connected to an electronic transmitter.

The simultaneous extension and retraction may be provided, in the first mode of operation for over the road use. In this manner, whenever the vehicle is pointing straight ahead, its width is quite small, and the wheels are very close to the sides of the vehicle. In a second mode of operation configured in the electronic controller, the wheels can be steered without simultaneous extension and retraction. This mode of operation would be preferred on the harvester is actually operating in the field harvesting crop. By not extending and retracting during field operations, unnecessary wear on the suspension components would be minimized (since there is no government requirement for a maximum width during field operations). A further advantage is that by extending and retracting to the minimum width, the rear wheel-to-wheel spacing can be varied to provide optimum wear on the tires.

In one rear axle arrangement, a single actuator on each side of the vehicle can simultaneously extend or retract the wheels as they are steered. In another arrangement, two actuators are required on each side of the vehicle. These actuators may be two linear actuators, two rotary actuators, or a linear and a rotary actuator.

Position sensors may be provided to detect the extension of the wheels away from the side of the agricultural harvester or the angular orientation of the wheels with respect to the agricultural harvester. The sensors can provide these measures directly, of the sensors may be located such that they do not indicate the angle of the wheel or the extension of the wheel directly. If sensors are provided in the system, their signals are provided to the electronic controller, which in the first mode of operation determines the actual angular orientations and the extensions of the wheels, and from that determination it directs the actuators to move simultaneously in order to synchronize the steering and extension and retraction of both wheels to ensure minimal wear on the wheels and to ensure that the wheels do not interfere with the side of the vehicle.

If the electronic controller has a second mode of operation, then in the second mode of operation, the electronic controller will process the position sensor signals to ensure the wheels neither extend nor retract as they are steered left or right. To select the mode of operation, an operator input device is provided such as a lever, button, switch, touch screen, keyboard, or other digital input device.

This operator input device is connected to electronic controller to signal the electronic controller to select the first or second mode of operation.

The position sensors may be rotary sensors to sense relative rotational movement or linear sensors to sense relative linear movement, depending upon the type of actuators and linkages used to attach the wheels to the combine. In one arrangement two rotary sensors are used. In another arrangement two linear sensors are used, and in another arrangement a rotary and a linear sensor are used.

The electronic controller is configured to monitor the operator input device that provides a signal indicating the desired steering angle. Electronic controller will calculate the desired degree of extension for the desired steering angle based at least upon the operator input device. The electronic controller is configured further to simultaneously steer the wheels as they are extended or retracted to move the wheels to a desired degree of extension for the indicated steering angle. The desired degree of extension is calculated to provide cuts between both sides of the combine and their rear wheels.

BRIEF DESCRIPTION OF THE DRAWINGS

FIG. 4 is a fragmentary top schematic view of a second alternative left rear wheel and axle arrangement for the agricultural harvester of FIG. 1.

DETAILED DESCRIPTION OF THE INVENTIONS

Figure 1:
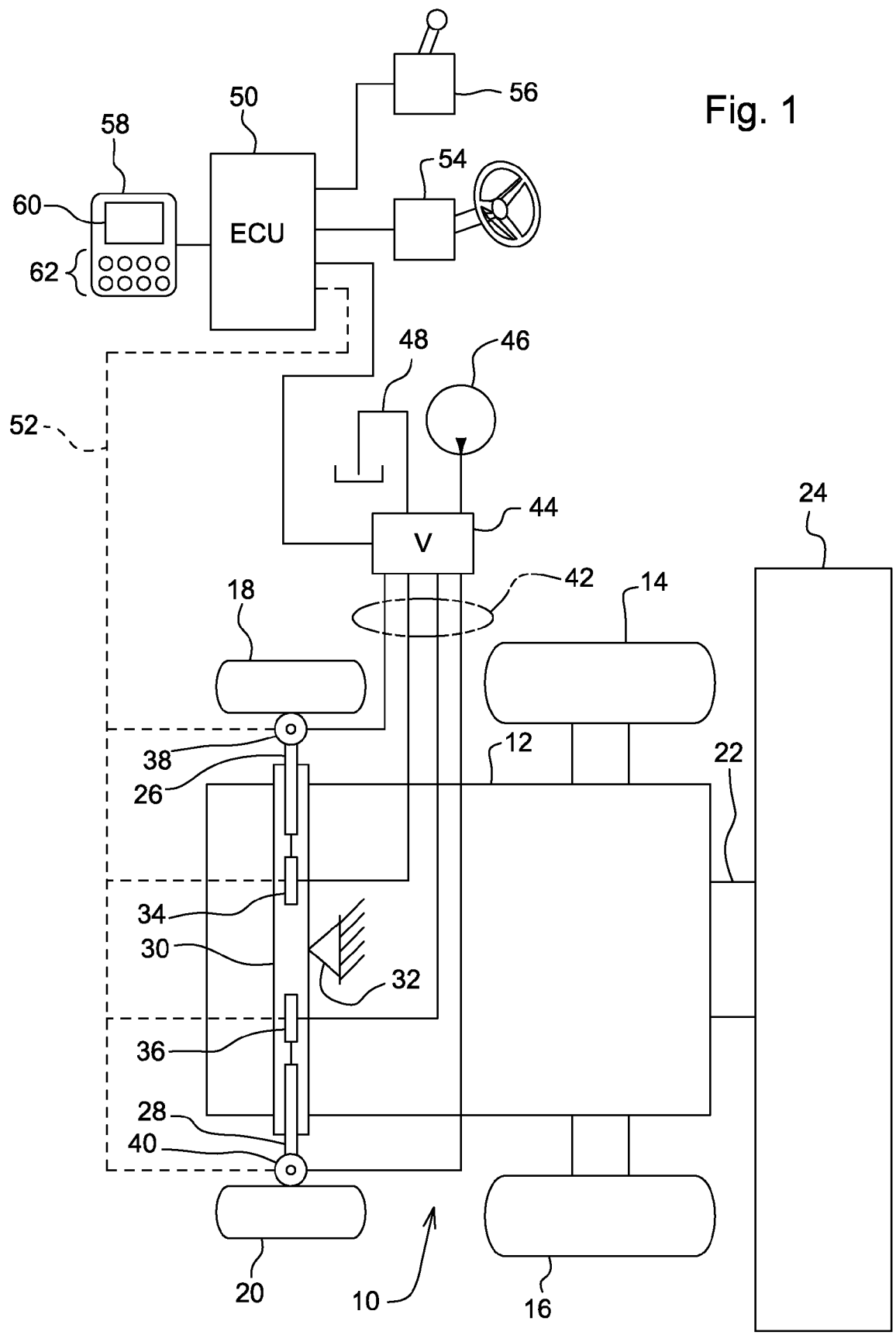
FIG. 1 is a schematic diagram of an agricultural harvester and steering control circuitry, including actuators, sensors, and operator input devices that are coupled to the steerable rear wheels of the harvester.

FIG. 1 shows an agricultural harvester 10 that includes a chassis 12 supported on two wheels 14, 16 and two rear wheels 18, 20. A feederhouse 22 is disposed at the front of the agricultural harvester 10 to convey crop material from header 24 into the internal threshing, separating, and cleaning sections of the agricultural harvester 10. These internal components are not shown herein and form no part of the invention.

Rear wheels 18, 20 are pivotable with respect to agricultural harvester 10. Further, they can be extended away from (or retracted toward) the sides of agricultural harvester 10. In the example shown in FIG. 1, wheels 18, 20 are supported on telescopic axles 26, 28 that are slightly supported on a laterally extending main axle 30. Main axle 30 is pivotally connected to the frame of the agricultural harvester 10 through pivot 32, which permits the axle to tilt side-to-side and adjust to the ground contours. Linear actuators, here shown as hydraulic cylinders 34, 36 are disposed to extend and retract telescopic axles 26, 28 when the cylinders 34, 36 are extended and retracted.

Rear wheels 18, 20 are pivoted by rotary actuators 38, 40 located at the outer ends of each of the two telescopic axles 26, 28. Rotary actuators 38, 40 permit wheels 18, 22 to pivot about substantially vertical axes located at the ends of the telescopic axles 26, 28.

The linear actuators and the rotary actuators are preferably hydraulically driven through hydraulic lines 42 that extended between a control valve 44 and the actuators. Control valve 44 is provided with hydraulic fluid under pressure from a pump 46 which it selectively communicates to each of the actuators and returns exhausted hydraulic fluid to a reservoir 48.

A digital electronic controller 50 is drivingly coupled to control valve 44 to signal it to open and close its various internal valves and thereby communicate hydraulic fluid under pressure to each of the linear actuators 34, 36 to extend and retract them, and to communicate hydraulic fluid under pressure to each of rotary actuators 38, 40 to rotate them.

Electronic controller 50 is also connected to position sensors disposed in the linear actuators and the rotary actuators via signal lines 52. In this manner, electronic controller 50 is configured to monitor the rotational and linear positions of the rotational and linear actuators.

Electronic controller 50 is also connected to a first operator input device 54, shown here as a steering wheel connected to a rotary shaft encoder. In the figure, the first operator input device 54 is shown to one side of agricultural harvester 10. However, the steering wheel and rotary shaft encoder are actually located at the operator station in the agricultural harvester and are the means used by the operator to steer the agricultural harvester.

When the operator turns the steering wheel of the first operator input device 54, device 54 generates a digital signal indicating the desired steering angle of the wheels. The signal is transmitted to the electronic controller 50, which processes the signal as described below. Electronic controller 50 is also connected to a second operator input device 56 which permits the operator to select among at least a first and a second mode of operation.

In particular, the operator is able to select an "over-the-road" mode of operation in which electronic controller 50 automatically extends and retracts rear wheels 18, 20 using actuators 34, 36 as it simultaneously steers the rear wheels 18, 20 using rotary actuators 38, 40. The operator is also able to select an "in-the-field" mode of operation in which the electronic controller 50 merely steers the wheels using rotary actuators 38, 40, and does not extend or retract the wheels.

In the first mode of operation, the over-the-road mode when the operator turns the steering wheel to steer the wheels to a more straight-ahead position, electronic controller 50 receives this signal from the first operator input device 54, calculates an appropriate degree of extension based upon the steering angle received from the first operator input device 54, and transmits signals to control valve 44 signaling it to retract the wheels using linear actuators 34,36 as it transmits signals to control now 44 signaling it to steer wheels 18, 20 toward-a more straight-ahead position.

In the first mode of operation, when the operator turns the steering wheel to steer the wheels away from the straight-ahead position, electronic controller 50 receives this signal from the first operator input device 54, calculates an appropriate degree of extension based upon the steering angle received from the first operator input device 54, and transmit signals to control valve 50 signaling it to extend the wheels using linear actuators 34, 36 as it steers wheels 18, 20 more toward a left or right turn position—a position farther away from the straight-ahead position as the operator requested.

Buy retracting the wheels as they are steered more in the straight-ahead position, electronic controller 50 insures that the wheels are as close as possible to the body 12 of the combine and within the legal overall width limits set by European governments for agricultural harvesters. By extending the wheels as the rear wheels 18, 20 are steered farther away from their straight-ahead position, electronic controller 50 insures that the wheel, does not interfere with the side of the agricultural harvester 10.

When the operator selects the second mode of operation, electronic controller 50 does not extend our retract the wheels when the operator turns the steering wheel. Since the vehicle is intended to be operating in the field, no maximum width requirement applies, and the wheels need not be retracted. Instead, electronic controller 50 steers the wheels to the left and to the right and straight-ahead without extending or retracting them. To ensure that the wheels do not interfere with the sides of the agricultural harvester can when they are turned, electronic controller 50 is configured to initially extend the wheels outward to a predetermined extension position when the operator selects the second mode of operation. Electronic controller 50 will only automatically extend the rear wheels 18, 20 in the second mode of operation if the vehicle is moving forward over the ground.

A third operator input device 58 connected to electronic controller 50 that is a combination of a touch screen 60 and a keyboard 62. Electronic controller 50 must know the size and shape of each wheel (which for purposes of this application includes the tire mounted thereon). The greater the diameter of the wheel, the more the wheel will tend to interfere with the side of the agricultural harvester 10 when it is steered to the left or the right. Consequently the farther the wheel must be extended on telescopic axles 26, 28 to ensure that it does not rob the side of the vehicle. For larger wheels—either larger in diameter or wider in tread width—the angle to which the combine may be steered may be significantly limited. This is true because the larger the wheel, the smaller the angle to which it can be turned before it interferes with the side of the agricultural harvester 10. Either that, or telescopic axle 26, 28 must be extended farther to prevent this rubbing. Furthermore, if the wheel has a wider profile (i.e. tread width), it cannot be retracted as far as a narrower profile wheel can be retracted, since it would cause the wider profile wheel to rub against the side of agricultural harvester 10.

To prevent this from occurring, the operator can be limited to a specific size rear wheel. Operators, however, often want to use a variety of rear wheel sizes depending on the crop being harvested and the ground conditions. To provide this capability electronic control unit 50 may be programmed to receive data indicative of the wheel size or shape from third operator input device 58, and to reduce or increase the amount of extension or retraction forgiven angles of steering to reduce or increase the total steering range that it will provide for the wheel.

In a preferred embodiment, when the operator enters parameters indicative of a large diameter wheel or a wide profile wheel, electronic controller 50 is configured to reduce the total angular range of steering (i.e. the maximum angle of turn to the left and the maximum angle of turn to the right) that it will permit.

Once the vehicle has reached the angular limit of steering, additional turning of the steering wheel by the operator will have no effect. The angle to which the wheels are steered will not increase.

Electronic controller 50 is also configured to increase the amount of extension it produces at each steering angle of the wheels to prevent the larger wheel from interfering with the sides of the agricultural harvester 10.

Similarly, when the operator enters parameters indicative of a smaller diameter wheel or a narrower wheel, electronic controller 50 is configured to increase the total angular range of steering and to decrease the amount of extension it produces at each steering angle of the wheels.

Operator input device 58 provides a way for the operator to enter characteristics of the wheel and the tire into electronic controller 50 to provide electronic controller 50 with the information it needs to perform the appropriate steering calculations.

In a preferred embodiment, operator input device 58 is configured to display a plurality of different tires, either by manufacturer name and standard dimension, or by other numbers or codes that are embedded in the wall or tread of the tire.

The operator can select among these displayed wheel/tire combinations (or tires) to thereby indicate the particular wheel/tire that is mounted on the rear wheel hubs of agricultural harvester 10. Electronic controller 50, upon receiving this information, is configured to a just the formulas by which it calculates the maximum angle to which the rear wheels can be steered, and the amount of extension appropriate for any such angle. Among other things, these formulas vary the ratio of steering angle to axle extension for wheel/tire combinations having a larger diameter than other wheel/tire combinations. For larger diameter wheel/tire combinations, the incremental distance of extension from the side of the agricultural harvester 10 will be greater or each incremental angle of steering. This ensures that larger wheel/tire combinations will remain close to the side of the agricultural harvester 10 while preventing them from rubbing against the side of agricultural harvester can.

The particular formulas involved depend, of course, on the particular geometry of the agricultural harvester 10, the position of the sides of the agricultural harvester with respect to the tires, the particular geometry of the tires, and the particular geometry of the wheels on which the tires are mounted. Formula parameters associated with each of these tires, or wheels/tire combinations can be stored in a database, an array of values, a list, or a lookup table within an electronic memory of electronic controller 50.

Once the operator has selected a particular rear wheel and/or tire, electronic controller 50 saves that value in its internal memory and uses it in all future calculations in the first mode of operation to (as described above) vary the total angle through which the wheel can be turned and vary the amount of extension it commands for any given steering angle.

Figure 2:
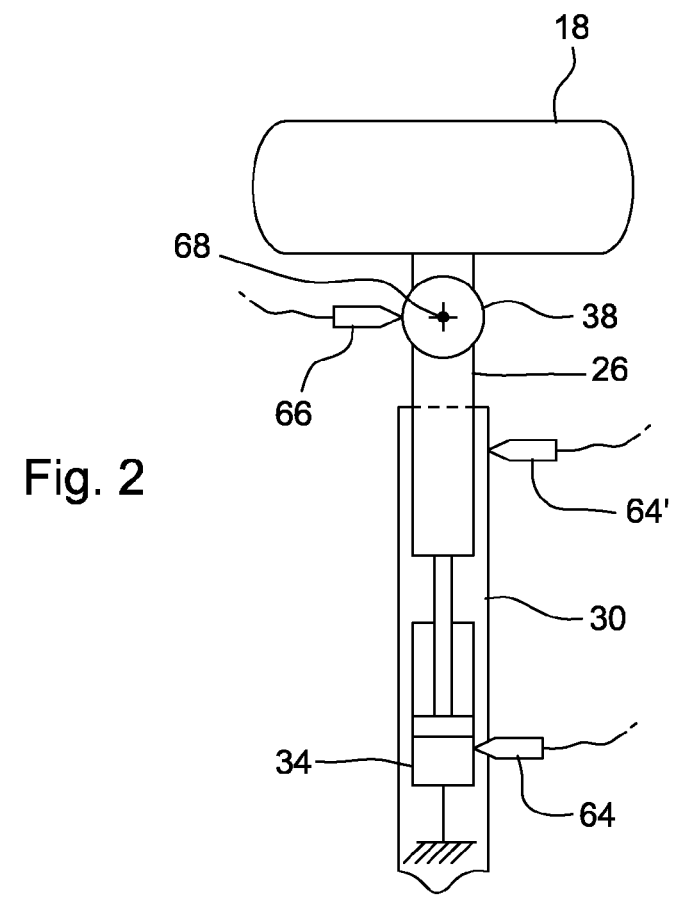
FIG. 2 is a fragmentary top schematic view of the left rear wheel and axle arrangement of the agricultural harvester of FIG. 1.
Figure 3:
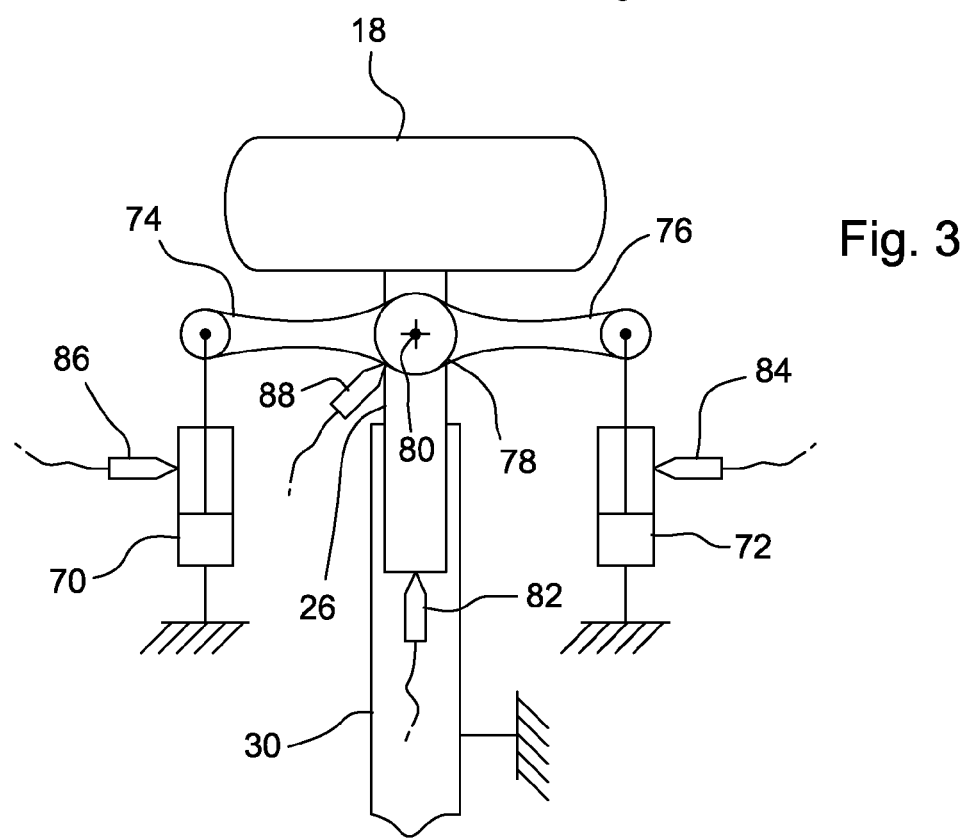
FIG. 3 is a fragmentary top schematic view of a first alternative left rear wheel and axle arrangement for the agricultural harvester of FIG. 1.

FIGS. 2-4 show several alternative rear wheel arrangements that can be operated in the manner described above to extend and retract the wheel while it is being steered. These are merely exemplary, however, and indicates that a wide variety of suspension arrangements can be used while still failing within the scope of the claims appended hereto. The arrangements shown in FIGS. 2-4 are all the left side rear wheel arrangements. The right side rear wheel arrangements would be identical, but in mirror image. All the actuators and sensors are coupled to electronic controller 50 to be respectively driven and monitored thereby in the same manner described above.

The first arrangement, shown in FIG. 2, is an enlarged view of the rear wheel arrangement shown in FIG. 1. In this arrangement, rear wheel 18 is mounted to a hub driven by rotary actuator 38. Rotary actuator 38, in turn, is fixed to the end of telescopic axle 26. Telescopic axle 26, in turn, is slidably supported in main axle 30. Linear actuator 34 is coupled between the main axle 30 and telescopic axle 26 to drive telescopic axle 26 out of and withdraw it into main axle 30. This movement constitutes the extension and retraction of rear wheel 18. An linear position sensor 64 is mounted to detect the movement of the rod or piston within linear actuator 34. An alternative linear position sensor 64' is disposed to sense the linear movement of telescopic axle 26 within main axle 30. A rotary position sensor 66 is disposed to sense the rotational position of rotary actuator 38, and thus the steering position of rear wheel 18 about steering axis 68, which is defined by the rotary actuator. Steering axis 68 is substantially vertical. It may, however, be disposed at an angle with respect to the vertical to provide additional room for steering about axis 68. The 4 position sensors described in FIG. 2, (as well as the position sensors described in FIGS. 3-4) are coupled to signal lines 52 to transmit their position signal to electronic controller 50.

The embodiment of FIG. 3 uses the same main axle 30 and telescopic axle 26 are employed as were illustrated in FIG. 2 and FIG. 1 but they are driven by a different arrangement of actuators connected to control valve 44. In FIG. 3, no rotary actuator 38 is shown. Instead, two linear actuators 70, 72 are shown that are coupled to main axle 30 (or to the chassis) of the agricultural harvester at one end, and have second ends that are coupled to steering arms 74, 76 that extend from pivoting hub 78. Rear wheel 18 is mounted for rotation on pivoting hub 78 and it is steered whenever pivoting hub 78 is steered by the extension or retraction of linear actuators which are here shown as hydraulic cylinders 70, 72.

In the arrangement of FIG. 3, electronic controller 50 controls the extension and retraction of rear wheel 18 and its steered angle by controlling the extension and retraction of linear actuators 70, 72. To extend rear wheel 18 without steering it, electronic controller 50 signals control valve 44 to extend both of the linear actuators 70, 72. To steer rear wheel 18 without extending or retracting it electronic controller 50 is configured to extend one of linear actuators 70, 72 and simultaneously retract the other of linear actuators 70, 72. If the linear actuators are extended and retracted in opposite directions an equal amount, rear wheel 18 will pivot about pivot point 80 neither extending nor retracting. It should be clear that any intermediate movement between these two extremes (i.e. movement that combines both steering and extension or retraction) can be provided by appropriate programming of electronic controller 50. Again, the particular formulas used in programming electronic controller 50 will vary depending upon the actual geometry of agricultural harvester 10 as well as the wheels and tires and for that reason is not described herein.

Several position sensors are provided in the arrangement of FIG. 3. These position sensors communicate to electronic controller 50 both the amount of extension and the steering angle of rear wheel 18. These two items of data can be provided by any two of the sensors shown in FIG. 3. The first position sensor, linear position sensor 82, is disposed to sense the degree of linear extension of telescopic axle 26 with respect to main axle 30. Linear position sensor 84 is disposed to sense the position of linear actuators 72. Linear position sensor 86 is disposed to sense the linear extension of linear actuators 70. Rotary position sensor 88 is disposed to sense the relative rotational position of hub 78 with respect to telescopic axle 26 about pivot point 80. Again, due to the geometry of the rear wheel arrangement of FIG. 3, both the amount of extension and the angular position of rear wheel 18 can be determined by electronic controller 50 from signals provided by any two of these four sensors.

In an alternative arrangement to the FIG. 3 arrangement, only one of linear actuators 70, 72 need be provided. The pivoting hub 78 can be replaced with a rotary actuator, such as rotary actuator 38 in FIG. 2, and the system can be operated with this rotary actuator and linear actuator. Either linear actuator 70 or linear actuator 72 can be used with rotary actuator 38 in this embodiment.

FIG. 4 illustrates a third rear wheel arrangement in which a telescopic axle is not employed. In this arrangement, rear wheel 18 is supported on leading link 90, which in turn is coupled to the chassis of agricultural harvester 10. This arrangement uses two rotary actuators 92, 94 to extend or retract rear wheel 18 from the side of agricultural harvester 10. Rotary actuators 92, 94 also function to steer rear wheel 18 with respect to agricultural harvester 10. In this arrangement, it takes the combined movement of actuators 92, 94 together to extend rear wheel 18 away from the side of agricultural harvester 10 while holding rear wheel 18 at a fixed steering angle. Steering rear wheel 18 without simultaneously extending it requires the operation of a single actuator, actuator 94.

In an alternative arrangement, a linear actuator 96 may be used instead of rotary actuator 92. Linear actuator 96, here as a hydraulic cylinder, causes leading or trailing link 90 to pivot toward or pivot away from the side of agricultural harvester 10. Again, the synchronized operation of both linear actuator 96 and rotary actuator 94 are required in order to extend rear wheel 18 from the side of agricultural harvester can without simultaneously steering it to the left or the right. In an alternative arrangement, leading link 90 could be reversed in mirror image form about a laterally extending mirror plane to be fixed to the side of agricultural harvester as a trailing link.

There are several position sensors that are possible to sense both the extension and the steering angle of rear wheel 18. In this embodiment any two of the sensors are capable of providing both items of information. Rotary position sensor 98 is disposed to detect the relative rotation of rotary actuator 94 (and therefore the angular position of wheel 18 and the hub on which it is mounted) with respect to agricultural harvester 10. Rotary position sensor 100 is disposed to sense the rotary position of rotary actuator 92 or (in the embodiment that does not use rotary actuator 92) the angular position of leading or trailing link 90 with respect to agricultural harvester 10. Linear position sensor 102 is disposed to sense the extension of linear actuator 96 and thus the relative rotation of rotary actuator 94 with respect to agricultural harvester 10.

The invention claimed is:

1. An agricultural harvester rear axle arrangement for an agricultural harvester (10) having a body (12), the arrangement comprising left and right rear wheels (18, 20); means for supporting the wheels for rotation about a generally vertical steering axis (38, 40, 78, 94) and for supporting the wheels for extension and retraction from the body of the combine (26, 28, 30, 90); actuator means for steering the wheels (38, 40, 70, 72, 94) and for extending and retracting the wheels (34, 36, 70, 72); an electronic controller (50) coupled to the actuator means to steer, extend and retract the wheels; and an operator input device (54) that provides a signal indicative of a desired steering angle, and further wherein the electronic controller (50) is configured to calculate a desired degree of extension for the desired steering angle based at least upon the signal indicative of the desired steering angle; and to substantially simultaneously steer the left and right rear wheels (18, 20) to the desired angle and extend the left and right rear wheels (18, 20) to the desired degree of extension.

2. The agricultural harvester rear axle arrangement of claim 1, wherein the electronic controller (50) is configured to substantially simultaneously steer and retract the left and right rear wheels.

3. The agricultural harvester rear axle arrangement of claim 1, further comprising a plurality of sensors (64, 64', 66, 82, 84, 86, 88, 98, 100) coupled to the electronic controller, said sensors being sufficient to determine the degree of steering, extension, and retraction of both wheels.

4. The agricultural harvester rear axle arrangement of claim 1, further comprising an operator input device (54) coupled to the electronic controller (50) to indicate a desired steering angle of the wheels.

5. An agricultural harvester rear axle arrangement for an agricultural harvester (10) having a body (12), the arrangement comprising left and right rear wheels (18, 20); means for supporting the wheels for rotation about a generally vertical steering axis (38, 40, 78, 94) and for supporting the wheels for extension and retraction from the body of the combine (26, 28, 30, 90); actuator means for steering the wheels (38, 40, 70, 72, 94) and for extending and retracting the wheels (34, 36, 70, 72); an electronic controller (50) coupled to the actuator means to steer, extend and retract the wheels, further comprising an operator input device (56) coupled to the electronic controller (50) to indicate to the electronic controller (50) a first mode of operation requiring substantially simultaneous steering, extension and retraction, and at least one other mode of operation in which steering is not substantially simultaneous with extension and retraction.

6. The agricultural harvester rear axle arrangement of claim 1, in which the means for extending and retracting the wheels include at least two linear actuators.

7. The agricultural harvester rear axle arrangement of claim 1, in which the means for steering and for extending and retracting the wheels comprises at least one linear actuator (34, 36, 96) and one rotary actuator (38, 40, 94).

8. An agricultural harvester rear axle arrangement for an agricultural harvester (10) having a body (12), the arrangement comprising left and right rear wheels (18, 20); means for supporting the wheels for rotation about a generally vertical steering axis (38, 40, 78, 94) and for supporting the wheels for extension and retraction from the body of the combine (26, 28, 30, 90); actuator means for steering the wheels (38, 40, 70, 72, 94) and for extending and retracting the wheels (34, 36, 70, 72); an electronic controller (50) coupled to the actuator means to steer, extend and retract the wheels, and further comprising a plurality of sensors (64, 64', 66, 82, 84, 86, 88, 98, 100) coupled to the electronic controller, said sensors being sufficient to determine the degree of steering, extension, and retraction of both wheels, in which the plurality of sensors comprises at least one sensor providing a signal indicative of rear wheel extension (64, 64', 82, 100, 102, 86 and 84) and at least one sensor providing a signal indicative of a rear wheel rotation (66, 88, 86 and 82, 86 and 84, 82 and 84, 98, 100, 98 and 100).

9. An agricultural harvester rear axle arrangement for an agricultural harvester (10) having a body (12), the arrangement comprising left and right rear wheels (18, 20); means for supporting the wheels for rotation about a generally vertical steering axis (38, 40, 78, 94) and for supporting the wheels for extension and retraction from the body of the combine (26, 28, 30, 90); actuator means for steering the wheels (38, 40, 70, 72, 94) and for extending and retracting the wheels (34, 36, 70, 72); an electronic controller (50) coupled to the actuator means to steer, extend and retract the wheels, and further comprising a plurality of sensors (64, 64', 66, 82, 84, 86, 88, 98, 100) coupled to the electronic controller, said sensors being sufficient to determine the degree of steering, extension, and retraction of both wheels, in which the plurality of sensors comprises at least two sensors providing signals indicative of rear wheel rotation (66, 88, 86 and 82, 86 and 84, 82 and 84, 98, 100, 98 and 100).

10. The agricultural harvester rear axle arrangement of claim 1, in which the means for supporting the wheels comprises at least one telescoping axle (26, 28).

11. The agricultural harvester rear axle arrangement of claim 1, in which the means for supporting the wheels comprises at least one leading link (90) or trailing link (90).

12. A method for operating an agricultural harvester rear axle having two steerable rear wheels (18, 20), the method comprising the steps of electronically monitoring an operator input device (54) that provides a signal indicative of a desired steering angle in a first mode of operation; calculating a desired degree of extension for the desired steering angle based at least upon the signal; and substantially simultaneously steering the rear wheels (18, 20) to the desired angle and extending the wheels (18, 20) to the desired degree of extension.

13. The method for operating an agricultural harvester rear axle of claim 12, in which the calculated desired degree of extension provides clearance between a side of the agricultural harvester (10) and the rear wheel (18, 20) that is adjacent to that side.

14. The method for operating an agricultural harvester rear axle of claim 13, further comprising the step of steering the rear wheels (18, 20) to the desired angle responsive to the signal in a second mode of operation while maintaining the degree of extension substantially constant.

* * * * *